United States Patent [19]
Mine

[11] Patent Number: 5,270,984
[45] Date of Patent: Dec. 14, 1993

[54] DISPLACEMENT AMPLIFICATION MECHANISM FOR PIEZOELECTRIC ELEMENTS

[75] Inventor: Kazuhiro Mine, Tokyo, Japan

[73] Assignee: NEC Corporation, Tokyo, Japan

[21] Appl. No.: 925,554

[22] Filed: Aug. 4, 1992

[30] Foreign Application Priority Data

Aug. 26, 1991 [JP] Japan .................................. 3-212537

[51] Int. Cl.⁵ .......................................... H01R 17/00
[52] U.S. Cl. ...................................... 367/140; 310/328; 310/323
[58] Field of Search ................. 367/140; 310/328, 323, 310/322, 330

[56] References Cited

U.S. PATENT DOCUMENTS

| | | | |
|---|---|---|---|
| 4,808,874 | 2/1989 | Stahlhuth | 310/328 |
| 4,976,553 | 12/1990 | Yamaguchi et al. | 310/328 |
| 5,049,775 | 9/1991 | Smits | 310/328 |

Primary Examiner—J. Woodrow Eldred
Attorney, Agent, or Firm—Laff, Whitesel, Conte & Saret

[57] ABSTRACT

In a displacement amplification mechanism for a piezoelectric element comprising a pair of lever arms for transmitting and amplifying the displacement of the piezoelectric element, and a bridge-shaped beam member held at ends of the lever arms with rivets and working as a further means for amplifying the displacement of the piezoelectric element, a semi-elliptical rib is formed in a central flat portion of the beam member to thereby increse the rigidity in the central flat portion.

16 Claims, 4 Drawing Sheets

DISPLACEMENT AMPLIFICATION MECHANISM FOR PIEZOELECTRIC ELEMENTS

BACKGROUND OF THE INVENTION

1. Field of the Invention

The present invention relates to a displacement amplification mechanism for a piezoelectric element by the use of a piezoelectric element as a primary drive and particularly such a mechanism improved with respect to accuracy in mechanical configuration.

2. Description of the Prior Art

As shown in FIG. 1, one of mechanical amplification mechanisms constructed in accordance with the prior art comprises a piezoelectric element 1 which is connected at its both end faces to a pair of lever arms 6 through displacement transmitting means, such as hinges 3, for transmitting the produced displacement A of the piezoelectric element to the respective lever arms 6. Each of the lever arms 6 is connected to the corresponding end face of a base plate 4 through each of hinges 5, the base plate having a mounting aperture 4a. The other ends of the lever arms 6 are connected to each other through a beam 14 made of a sheet material which extends in the form of a bridge between the lever arms 6. The beam 14 is held at ends of the lever arms 6 with flat head rivets 8. In the mechanism thus constructed, when an electric voltage is applied to the piezoelectric element 1 to cause a displacement in the direction of A as shown in FIG. 1, the displacement A is transmitted to the respective lever arms 6 through the displacement transmitting means. The displacement A transmitted to each of the lever arms 6 is then amplified at the tip ends of the lever arms 6. The amplified displacement is axially transmitted to the bridge-shaped beam 14 at its opposite ends. The beam 14 is deformed in the direction of B perpendicular to the direction of the displacement applied thereto at the direction of the displacement applied thereto at the opposite ends according to the well known buckling theory. The maximum displacement B occurs at the central portion of the beam 14. When the applied voltage is shut down, the piezoelectric element 1 returns to its original configuration and the central portion of the beam 14 also returns to its original position.

In the prior art mentioned above, for example, if it is assumed that the displacement of the piezoelectric element 1 is equal to 8 μm, the rate of amplification by the lever arm being about four times and the beam being 0.1 mm thickness, 2.6 mm width and 16 mm length, the maximum displacement equal to 180 μm provides the maximum force equal to 35 gf when the displacement is constrained. Since the beam is made of the sheet material, however, the central flat portion of the beam is undesirably curved into an arcuate configuration as the voltage is applied to the piezoelectric element.

Therefore, if the central flat portion of the beam carries a drive such as a magnetic head for VTR dynamic tracking, there are created cracks at the joint between the beam and the central part of the magnetic head.

Another problem in the prior art is that the maximum displacement is reduced 5%-15% when the deformation is suppressed as by joining the drive such as magnetic head to the central flat portion of the beam.

SUMMARY OF THE INVENTION

It is therefore an object of the present invention to provide a displacement amplification mechanism for piezoelectric elements, which can prevent the central flat portion of a beam from being deformed into an arcuate configuration and which can prevent the maximum displacement from being reduced by joining a drive to the central flat portion of the beam.

To this end, the present invention provides a displacement amplification mechanism for piezoelectric elements which includes a pair of lever arms for transmitting and amplifying the displacement of the piezoelectric element, and a beam member connecting the ends of the lever arms and working as a further means for amplifying the displacement of the piezoelectric element, the beam member being in the form of a bridge having a central flat portion, characterized in that the beam member is provided with preventing means for preventing the central flat portion of the beam member from being deformed into an arcuate configuration. In addition to the preventing means, at least one notch or cutout is formed at a prescribed position on each of both inclined planes of the beam member and in the vicinity of the central flat portion of the beam member.

DESCRIPTION OF THE PREFERRED EMBODIMENTS

According to the present invention, as mentioned above, the displacement amplification mechanism for piezoelectric elements comprises a beam member held at ends of a pair of lever arms and working as displacement amplifying means, the beam member being in the form of a bridge having a central flat portion and being provided with preventing means for preventing the central flat portion from being deformed into an arcuate configuration. The preventing means may be, for example, in the form of a rib. The rib serves to increase the geometrical moment of inertia in the central flat portion of the beam member so that the central flat portion of the beam member will not be deformed into an arcuate configuration when an electric voltage is applied to the piezoelectric element. If the rib is crucial, the central flat portion of the beam member may be further increased in rigidity. In addition, if the central flat portion of the beam member is turned at two side edges to form an L-shaped cross-section, the central flat portion of the beam member may be also increased in rigidity. This may be similarly accomplished by forming the central flat portion of the beam member to have its thickness larger than that of the other beam portion. Moreover, reduction in the displacement may be more effectively prevented by forming a plurality of notches at a prescribed position on both inclined planes of the beam member, in addition to the aforementioned means for increasing the rigidity in the central flat portion of the beam member.

The width of the central flat portion of the beam member may be equal to or larger than that of the inclined plane of the beam member.

Next, the present invention will be described in more detail with reference to the drawings.

Figure 1:
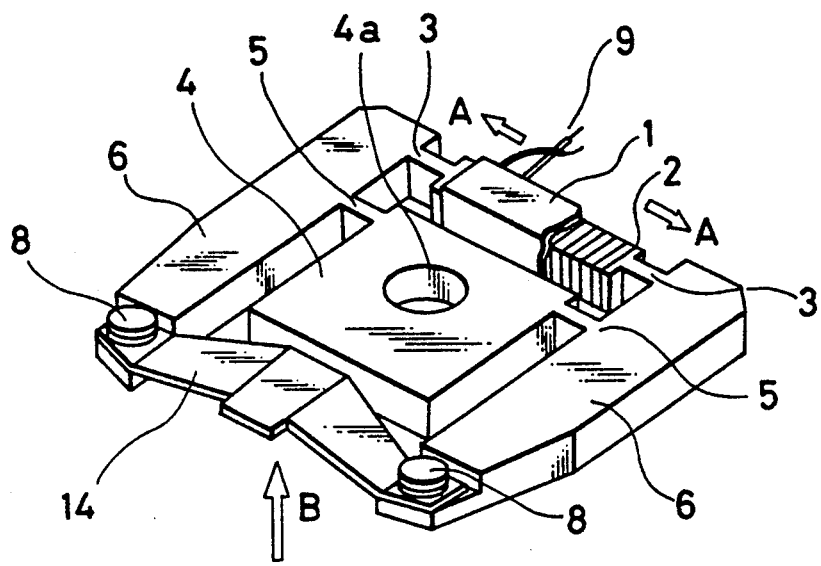
FIG. 1 is a perspective view of a displacement amplification mechanism for a piezoelectric element constructed in accordance with the prior art.
Figure 2A:
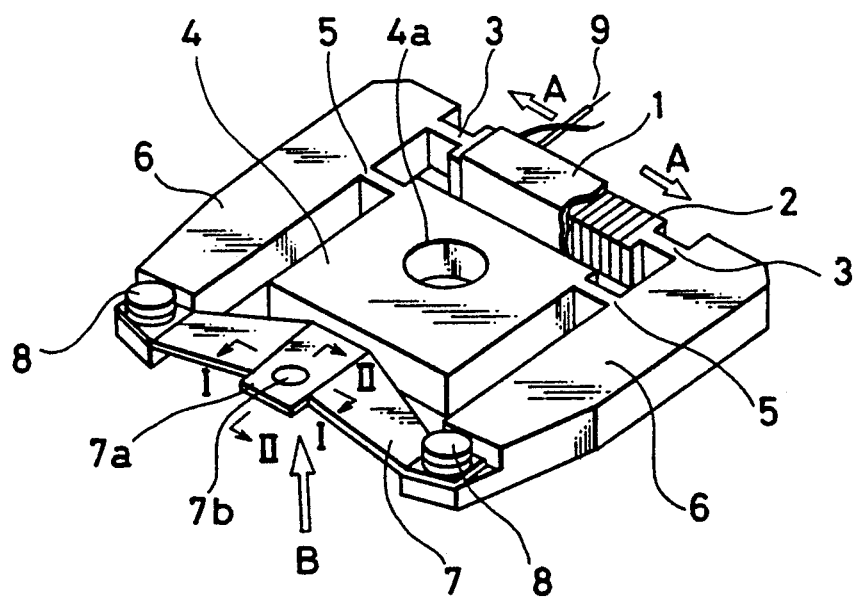
FIG. 2A is a perspective view of a first embodiment of a displacement amplification mechanism for a piezoelectric element constructed in accordance with the present invention.

Referring first to FIG. 2A, there is shown a piezoelectric element 1 comprising a stack of a plurality of flat plates made of lead zirconate titanate (PZT), common electrodes being sandwiched between the flat plates, the electrodes being connected in parallel with each other and a plastic jacket covering the stack. The piezoelectric element 1 is joined at each end to the flat end portion of each of hinges 3 having T-shaped section with adhesives 2 such as epoxy resin or other synthetic resins. Each of the hinges 3 is connected to the corresponding one of a pair of lever arms 6. Each of the lever arms 6 is connected to the corresponding one of the opposite sides of a base plate 4 through each of flat plate-shaped hinges 5. The base plate 4 includes a mounting aperture 4a formed therein.

The other end of each of the lever arms 6 is connected to a beam member 7 at the corresponding end through a rivet 8. The beam member 7 is formed of a thin spring metal plate as by pressing, press-cutting or stamping and has a substantially inverse V-shaped configuration which has a central flat portion 7a and a rib 7b formed in the central flat portion 7a. As mentioned above, the beam member 7 is held at ends of the lever arms 6 with a clamping mechanical member such as rivets 8. The rib 7b may be trapezoidal, semi-elliptical, V-shaped, U-cut or the like.

In the mechanism thus constructed, when an electric voltage is applied to the piezoelectric element 1 through lead 9, a displacement is caused in the direction of A as shown in FIG. 2A. The displacement A is transmitted to the respective lever arms 6 through the hinges 3 and amplified at the tip ends of the lever arms 6. The amplified displacement is then axially transmitted to bridge-shaped beam member 7 held between the lever arms 6 through the tip ends of the lever arms 6. As well known by the buckling theory, the beam member 7 is displaced on both ends thereof to be deformed in the direction of B perpendicular to the direction of the displacement applied to the both ends thereof. Thus, the maximum displacement B of the beam member 7 takes place at the central flat portion 7a thereof. When the applied voltage is thereafter removed from the piezoelectric element 1, the piezoelectric element 1 returns to its original configuration and the central flat portion 7a of the beam member 7 also returns to its original position.

One example of the first embodiment will be described as follows.

Figure 2B:
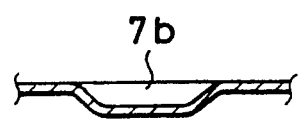
FIG. 2B is a partially sectional view of the central flat portion of the beam member shown in FIG. 2A, taken along a line I—I
Figure 2C:
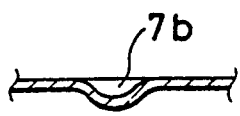
FIG. 2C is a partially sectional view of the central flat portion of the beam member shown in FIG. 2A, taken along a line II—II.

It is now assumed that the displacement of the piezoelectric element 1 is equal to 8 $\mu$m, the rate of amplification by the lever arms 6 being about four times and the beam member 7 being 0.10 mm in thickness, 2.6 mm in width, 0.40 mm in height and 16 mm in whole length, and the central flat portion 7a of the beam member 7 being 0.1 mm in thickness, 2.9 mm in width and 3.0 mm in length. It is also assumed that a semi-elliptical rib 7b formed in the central flat portion 7a of the beam member 7 as shown in FIGS. 2B and 2C is 2 mm in length, 1 mm in width and 0.25 mm in depth. In such arrangement and dimensions, the maximum displacement produced therein was equal to 190 $\mu$m and produced the maximum force equal to 35 gf when the displacement is constrained. The central flat portion of a beam constructed according to the prior art without any rib showed an arcuate deformation having a radius equal to about 10 $\mu$m on the maximum displacement of the beam member. On the contrary, the embodiment of the present invention did not show any mechanical deformation in the central flat portion 7a of the beam member 7 at the maximum displacement even under the microscope at 100 diameters. Consequently, when a drive such as VTR magnetic heads was mounted on the central flat portion 7a of the beam member 7, experiments showed that any abnormality such as crack or the like was not observed at the junction between the central flat portion of the beam member and the two magnetic heads.

Figure 2D:
FIG. 2D shows a stiffening rib having a trapezoidal cross-section.
Figure 2E:
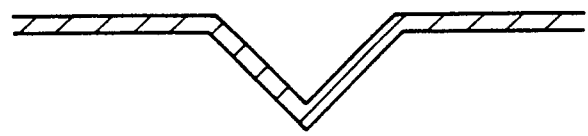
FIG. 2E shows a stiffening rib having a V-shaped cross-section.

The rib may have any other suitable cross-sectional shapes such as trapezoidal (FIG. 2D) or V-shaped (FIG. 2E).

Figure 3A:
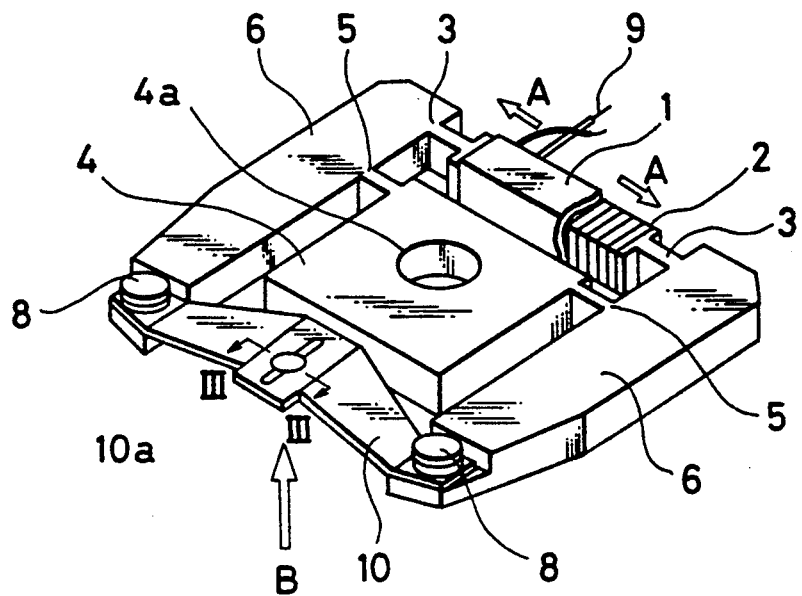
FIG. 3A is a perspective view of a second embodiment of a displacement amplification mechanism for a piezoelectric element constructed in accordance with the present invention and FIG. 3B is a partially sectional view of the central flat portion of the beam member shown in FIG. 3A, taken along a line III—III.
Figure 3B:

Referring next to FIGS. 3A and 3B, there is shown a second embodiment of the present invention in which parts similar to those of the first embodiment are denoted by similar reference numerals and will not be described herein in detail.

The second embodiment includes, in place of the beam member 7 of the first embodiment, an inverse V-shaped beam member 10 having a central flat portion 10a in which a crucial rib 10b is formed as shown in FIG. 3B. One example of the second embodiment will be described as follows.

It is now assumed that the displacement of the piezoelectric element 1 is equal to 8 $\mu$m, the rate of amplification by the lever arms 6 being about four times and the beam member 10 being 0.10 mm in thickness, 2.6 mm in width, 0.40 mm in height and 16 mm in whole length, and the central flat portion 10a of the beam member 10 being 0.10 mm in thickness, 2.9 mm in width and 3.0 mm in length, as in the first embodiment. It is also assumed that the crucial rib 10b formed in the central flat portion 10a of the beam member 10 is composed of two semi-elliptical ribs each being 2 mm in length, 1 mm in width and 0.2 mm in depth, as shown in FIG. 3B. In this arrangement and dimensions, the maximum displacement produced therein was equal to 190 $\mu$m and produced the maximum force 35 gf when the displacement is constrained, as in the first embodiment. The beam member 10 was maintained flat at the central flat portion 10a under the maximum displacement of the beam member 10 and showed no arcuate deformation at the portion 10a. Further, the central flat portion 10a of the beam member 10 had a parallelism equal to or less than 10 μm relative to the base plate 4. Although the side edge of the central flat portion 10a of the beam member 10 outwardly extended beyond a line connecting between the center axes of the mounting rivets 8, the entire structure was increased in rigidity. Thus even when the central flat portion 10a of the beam member 10 was subjected to a load from the drive mounted and joined thereon, any dynamic deformation was not produced while providing an increased shape accuracy.

Figure 4:
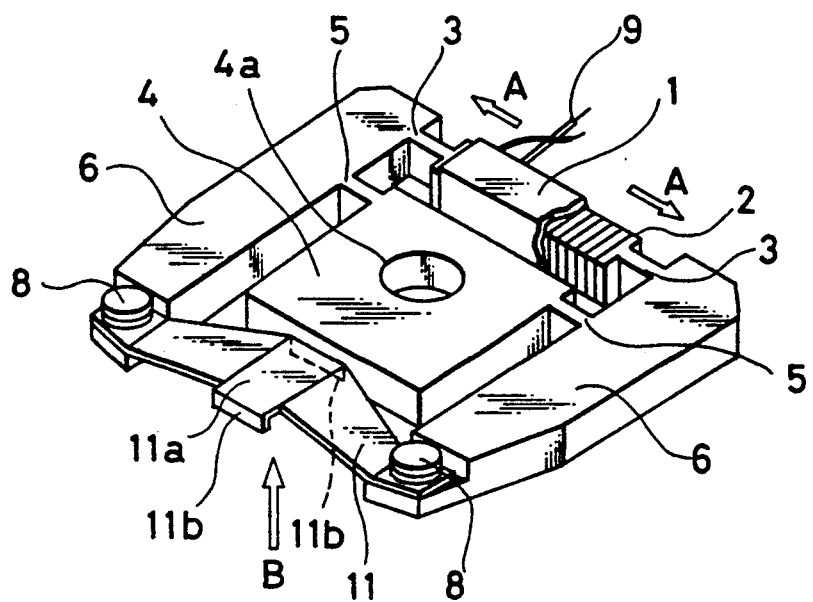
FIG. 4 is a perspective view of a third embodiment of a displacement amplification mechanism for a piezoelectric element constructed in accordance with the present invention.

Referring to FIG. 4, there is shown a third embodiment of the present invention in which parts similar to those of the first embodiment are denoted by similar reference numerals and will not be described herein in detail.

The third embodiment includes, in place of the beam member 7 of the first embodiment, an inverse V-shaped beam member 11 which has a central flat portion 11a formed therein, the central flat portion 11a being turned downwardly at both side edges to form turned side edges 11b having an L-shaped cross-section. One example of the third embodiment will be described as follows.

As in the previous embodiments, it is now assumed that the displacement of the piezoelectric element 1 is equal to 8 μm, the rate of amplification by the lever arms 6 being about four times and the beam member 11 being 0.10 mm in thickness, 2.6 mm in width, 0.40 mm in height and 16 mm in whole length, as in the first embodiment. It is also assumed that the central flat portion 11a of the beam member 11 is 0.10 mm in thickness, 2.9 mm in width and 3.0 mm in length and the turned side edges 11b having the L-shaped cross-section as shown in FIG. 4 have a height equal to about 0.5 mm. In this arrangement and dimensions, the beam member 11 produced the maximum force equal to 35 gf when the maximum displacement equal to 190 μm was constrained, as in the first embodiment. The central flat portion 11a of the beam member 11 was maintained flat under the maximum displacement of the beam member 11 and showed no arcuate deformation.

Figure 5:
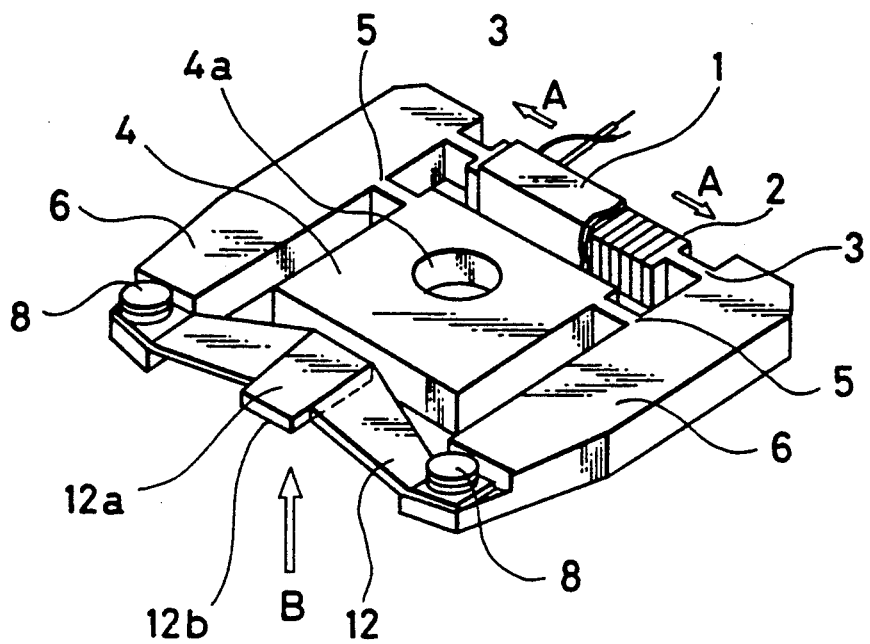
FIG. 5 is a perspective view of a fourth embodiment of a displacement amplification mechanism for a piezoelectric element constructed in accordance with the present invention.

FIG. 5 shows a fourth embodiment of the present invention in which parts similar to those of the first embodiment are denoted by similar reference numerals and will not be described herein in detail.

The fourth embodiment includes, in place of the beam member 7 of the first embodiment, a beam member 12 having a central flat portion 12a which is formed of a sectional plate material 12b, the central flat portion 12a having a thickness larger than that of the other beam portions. An example of the fourth embodiment will be described as follows.

As in the previous embodiments, it is also assumed herein that the displacement of the piezoelectric element 1 is equal to 8 μm, the rate of amplification by the lever arms 6 being about four times, and the beam member 12 being 0.10 mm in thickness, 2.6 mm in width, 0.40 mm in height and 16 mm in whole length, except that the central flat portion 12a has a thickness equal to 0.20 mm and is 2.9 mm in width and 3.0 mm in length. In this arrangement and dimensions, the beam member 12 also produced the maximum force equal to 35 gf when the maximum displacement equal to 190 μm was constrained, as in the first embodiment. The beam member 12 was maintained flat at the central flat portion 12a under the maximum displacement and showed no mechanical deformation at the portion 12a. Since the beam member 12 utilizes the sectional plate material 12b, any additional work such as drawing or bending, which is used on forming the rib or the turned side edges, is not required on pressing the beam member 12. Thus, the beam member 12 can be more easily formed to have the central flat portion 12a as formed. Of course, it is possible to form the rib in the central flat portion 12a or the turned side edges to thereby attain the effect as mentioned above.

Figure 6:
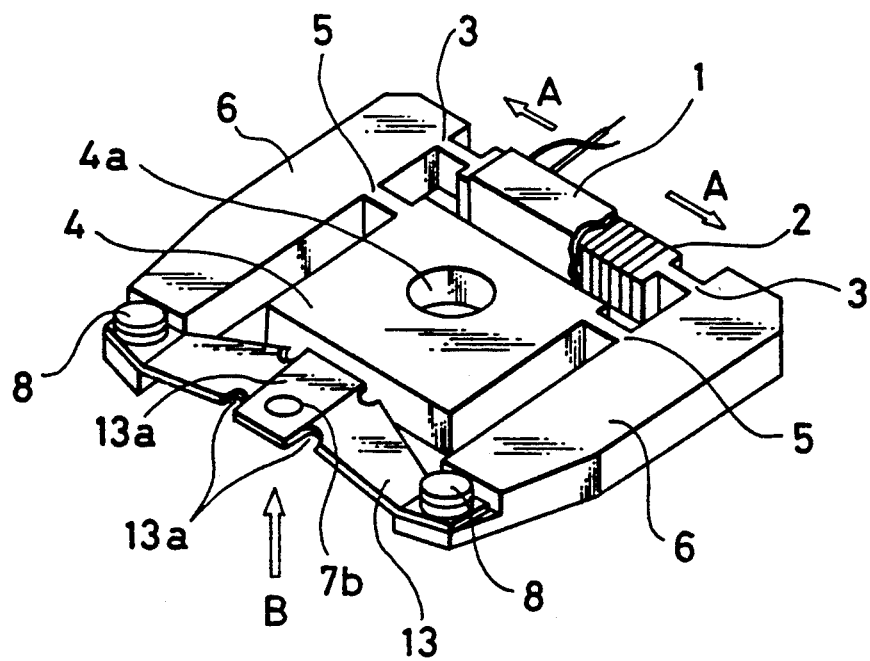
FIG. 6 is a perspective view of a fifth embodiment of a displacement amplification mechanism for a piezoelectric element constructed in accordance with the present invention.

FIG. 6 shows a fifth embodiment of the present invention in which parts similar to those of the previous embodiments are denoted by similar reference numerals and will not be described herein in detail.

The fifth embodiment is substantially the same as the above first to fourth embodiments, except that a plurality of notches, for example, semi-circular notches are made on upper ends of both inclined planes of the beam member and preferably adjacent to the central flat portion of the beam member. An example of the fifth embodiment will be described as follows.

As in the previous embodiments, it is also assumed herein that the displacement of the piezoelectric element 1 is equal to 8 μm, the rate of amplification by the lever arms 6 being about four times, and the beam member 13 being 0.10 mm in thickness, 2.6 mm in width, 0.40 mm in height and 16 mm in whole length, and a central flat portion 13a of a beam member 13 being 0.10 mm in thickness, 2.9 mm in width and 3.0 mm in length. It is further assumed that the semi-elliptical rib 7b formed in the central flat portion 13a of the beam member 13 is 2 mm in length, 1 mm in width and 0.25 mm in depth. Each of four semi-circular notches 13b, which is made on the prescribed position of both inclined planes of the beam member 13, has a radius equal to about 0.30 mm. In this arrangement and dimensions, the maximum displacement equal to 210 μm produced the maximum force 35 gf when the displacement is constrained. When a drive such as a magnetic head in the form of a metal cube having an edge equal to 3 mm, a thickness equal to 0.14 mm and a weight equal to 5 mg was mounted on and bonded to the central flat portion 13a of the beam member 13, the maximum displacement was reduced about 5% or less.

The above notch may be in the form of rectangle, triangle, trapezoid or the like.

As will be apparent from the foregoing, the present invention provides a displacement amplifying beam member having a central flat portion which can be formed into various configurations such as ribbed, L-shaped cross-section, increased thickness and a combination thereof, the beam member being able to be provided with at least one notch at a prescribed position on each of both inclined planes of the beam member. These configurations are very effective to prevent the central flat portion of the beam member from being deformed into the arcuate configuration and also to eliminate or suppress reduction of the maximum displacement due to the equipment of the drive to the central flat portion of the beam member. Therefore, the displacement amplification mechanism of the present invention can resist a centrifugal force from a VTR drum during rotating at 7,500 rpm and also withstand a durability test under an applied DC voltage equal to 150 V and a frequency equal to 600 Hz, with high reliability.

What is claimed is:

1. A displacement amplification mechanism for a piezoelectric element comprising:

a pair of lever arms for transmitting and amplifying a displacement of said piezoelectric element;

said piezoelectric element being fixed between first end portions of said lever arms;

a beam member fixed between second end portions of said lever arms and working as a further means for amplifying the displacement of said piezoelectric element;

said beam member being in the form of a bridge having a central flat portion, said central flat portion of said beam member having preventing means for preventing said central flat portion from being deformed into an arcuate configuration.

2. The displacement amplification mechanism for a piezoelectric element as defined in claim 1 wherein said preventing means comprises a rib formed in said central flat portion.

3. The displacement amplification mechanism for a piezoelectric element as defined in claim 2 wherein said rib is a recess which is trapezoidal in a cross-sectional shape.

4. A displacement amplification mechanism for a piezoelectric element which includes a pair of lever arms for transmitting and amplifying the displacement of said piezoelectric element, and a beam member connecting the ends of said lever arms and working as a further means for amplifying the displacement of said piezoelectric element, said beam member being in the form of a bridge having a central flat portion, said central flat portion of said beam member having a rib means formed in said central flat portion to prevent it from being deformed, wherein said rib is semi-elliptical.

5. The displacement amplification mechanism for a piezoelectric element as defined in claim 2 wherein said rib is a recess which is V-shaped in a cross-sectional shape.

6. The displacement amplification mechanism for a piezoelectric element as defined in claim 2 wherein said rib is a recess which is a predetermined cross-sectional shape which stiffens said central flat portion.

7. A displacement amplification mechanism for a piezoelectric element which includes a pair of lever arms for transmitting and amplifying the displacement of said piezoelectric element, and a beam member interconnecting corresponding ends of said lever arms and working as a further means for amplifying the displacement of said piezoelectric element, said beam member being in the form of a bridge having a central flat portion, said central flat portion of said beam member having means formed in said central flat portion to prevent it from being deformed, wherein said deformation preventing means in said central flat portion is in the form of two downwardly turned side edges formed on said central flat portion.

8. The displacement amplification mechanism for a piezoelectric element as defined in claim 7 wherein each of said downwardly turned side edges has an L-shaped cross-section.

9. The displacement amplification mechanism for a piezoelectric element as defined in claim 1 wherein said preventing means is provided by said central flat portion having a thickness which is greater than the thickness of the other beam portions.

10. The displacement amplification mechanism for a piezoelectric element as defined in claim 1 wherein said beam member has two inclined planes extending from opposite sides of said central flat portion to said second end portions of said lever arms, at least one notch is further formed on upper ends of each of said inclined planes of said beam member.

11. The displacement amplification mechanism for a piezoelectric element as defined in claim 10 wherein said notch is formed in the vicinity of the central flat portion.

12. The displacement amplification mechanism for a piezoelectric element as defined in claim 10 wherein said notch is semi-circular.

13. The displacement amplification mechanism for a piezoelectric element as defined in claim 2 wherein said beam member has two inclined planes extending from opposite sides of said central flat portion to said second end portions of said lever arms, at least one notch is further formed on upper ends of each of said inclined planes of said beam member.

14. The displacement amplification mechanism for a piezoelectric element as defined in claim 7 wherein said beam member has two inclined planes extending from opposite sides of said central flat portion to said second end portions of said lever arms, at least one notch is further formed on upper ends of each of said inclined planes of said beam member.

15. The displacement amplification mechanism for a piezoelectric element as defined in claim 9 wherein said beam member has two inclined planes extending from opposite sides of said central flat portion to said second end portions of said lever arms, at least one notch is further formed on upper ends of each of said inclined planes of said beam member.

16. A mechanical amplification mechanism for piezoelectric elements, said mechanism comprising:

a base plate;

a pair of fulcrum members protruding in a first direction from the opposite side edges of said base plate;

a pair of lever arms respectively mounted on said fulcrum on the opposite side of said base plates;

each of said lever arms having a longitudinal axis disposed in a second direction which is substantially perpendicular to said first direction;

a piezoelectric element fixed between the first end portions of said lever arms;

a beam member fixed between second end portions of said lever arms, said beam member being in the form of a bridge having a central flat portion, and working as a further means for amplifying displacements of said piezoelectric element; and a rib formed with a recess in said central flat portion of said beam member, to prevent said central flat portion from being deformed into an arcuate configuration.

* * * * *